July 13, 1965 J. COHN ETAL 3,195,052

RADIO RECEIVER CIRCUIT WITH AUDIO NOISE BLANKER FOR SUSTAINED IMPULSES

Filed Jan. 19, 1962 2 Sheets-Sheet 1

INVENTORS
JONA COHN
ORVILLE M. ENESS.
BY Mueller & Aichele
ATTYS.

July 13, 1965 J. COHN ETAL 3,195,052

RADIO RECEIVER CIRCUIT WITH AUDIO NOISE BLANKER FOR SUSTAINED IMPULSES

Filed Jan. 19, 1962 2 Sheets-Sheet 2

INVENTORS
JONA COHN
ORVILLE M. ENESS

BY Mueller & Aichele

ATTYS.

United States Patent Office 3,195,052

Patented July 13, 1965

3,195,052

RADIO RECEIVER CIRCUIT WITH AUDIO NOISE BLANKER FOR SUSTAINED IMPULSES

Jona Cohn, Morton Grove, and Orville M. Eness, Chicago, Ill., assignors to Motorola, Inc., Chicago, Ill., a corporation of Illinois Filed Jan. 19, 1962, Ser. No. 168,032
10 Claims. (Cl. 325—478)

This invention relates in general to noise suppression in radio receivers and in particular to a noise blanking system including a blanking circuit in the audio portion of a radio communications receiver in combination with a blanking circuit in the radio frequency portion thereof.

In radio receivers, it is well known that interference in the form of electrical noise pulses superimposed on the carrier signal can seriously impair reliable communications. These disturbance pulses stem from either man-made or atmospheric electrical static sources. In mobile and portable radio equipment, problems produced by such static, especially man-made, are particularly acute for the particular reason that transmitters are frequently of low or moderate power for the distances received signal will seldom be much stronger than nearby disturbance pulses. Furthermore, the mobile radio receiver may be in an area which is not only remote from the transmitter but likewise located in close proximity to sources of man-made static, as for example, auto ignition systems, power lines, X-ray machines, and related sources. In such situations, communication may be maintained only with considerable difficulty, and may completely fail.

One method of eliminating the effect of such undesirable disturbances is to provide a means for suppressing any such noise pulses of amplitude greater than the carrier signal, usually within the radio frequency portion of the receiver. This can be accomplished by detecting the presence of the undesired disturbance pulses and applying control pulses in response to the same for suitable blanking action at another stage in the receiver, preferably within the first intermediate frequency amplifier portion. One such radio frequency noise blanking system is disclosed and claimed in Patent No. 2,901,601, issued August 25, 1959, to Roy A. Richardson et al. and assigned to the assignee of the present invention.

There are, however, certain disadvantages that may be inherent in the use of such radio frequency noise blanking systems. For example, in blanking on disturbance pulses of excessively long durations, the highly selective tuned circuits of the filter following the first intermediate frequency amplifier portion may not have sufficient energy to fill in the gaps produced by cutting off this amplifier. As a result, the carrier decreases in amplitude in a series of damped oscillatory pulses or wave forms. On passing through the receiver, the wave fronts of these damped oscillator pulses may produce an undesirable output in the loudspeaker of the receiver in the form of "pops." Further, if the carrier is allowed to reach a condition of sustained zero amplitude, the noise generated in the stages following the first IF amplifier may likewise be rendered audible.

Such long duration noise pulses are known to arise from ignition systems of some propane buses, or they may arise from electrical systems with a high intensity spark. In still other systems, a stream of closely spaced noise pulses are generated that may have the effect of singular long duration noise pulses.

Accordingly, one object of the present invention is to provide a supplementary audio frequency noise blanking system to complement a radio frequency blanking system which deactivates the audio portion of the receiver during the occurrence of carrier voids.

Another object of the present invention is to provide a supplementary audio frequency noise blanking system responsive to a predetermined drop in the carrier signal strength in the receiver to deactivate the audio portion of the receiver.

A feature of the present invention is the provision of a highly selective receiver having a supplementary audio noise blanking circuit coupled thereto and responsive to predetermined decreases in gain in a plurality of receiver stages caused by voids appearing in the carrier signal and for applying indications thereof to decouple the audio stages of the receiver.

Another feature of the present invention is the provision of a highly selective receiver having a supplementary audio frequency noise blanking circuit including diode sampling gates coupled to a plurality of stages in the receiver preceding the second limiter for detecting voids in the carrier signal as predetermined decreases in its signal strength.

Another feature of the present invention is the provision of a supplementary audio frequency noise blanking circuit including a pulse stretching circuit wherein for sustaining the deactivation of the receiver's audio stages until such time as the carrier signal has regained full strength.

Still another feature is the provision of a supplementary audio frequency noise blanking circuit including a fast acting trigger device operating a diode audio gate in response to carrier voids whereby the audio stages of the receiver are effectively decoupled from the preceding stages of the receiver. By virtue of the rapid switching rate of the trigger device, transients are prevented from developing in the audio range which would be audible in the receiver loudspeaker.

Further objects, features, and attendant advantages of the invention will be apparent upon consideration of the following description and the accompanying drawings in which.

In practicing the invention, a highly selective frequency modulation superheterodyne receiver which includes a radio frequency noise blanking circuit is further provided with a supplementary audio frequency noise blanker circuit having means for detecting voids in the carrier signal that may result on blanking of disturbance pulses of excessively long durations in the radio frequency portion of the receiver. The supplementary audio frequency noise blanker circuit includes diode sampling gates coupled to a plurality of stages preceding the second limiter, preferably three such stages, and including means for detecting such voids as predetermined decreases in carrier signal strength. The sampling gates apply voltage pulses to pulse amplifying means when the carrier signal strength drops. The pulses are amplified and utilized to decouple the audio portion of the receiver for the duration of their occurrence. This is accomplished by employing the amplified control pulses to trigger a switching device to reverse bias a diode audio gate coupling the detector of the receiver to first audio stage thereof. Further, pulse stretching circuitry is provided in the pulse amplifying means to artifically lengthen the control pulses to insure that the audio stages will remain decoupled until the carrier has regained the required strength, and for a predetermined time thereafter.

Figure 1:
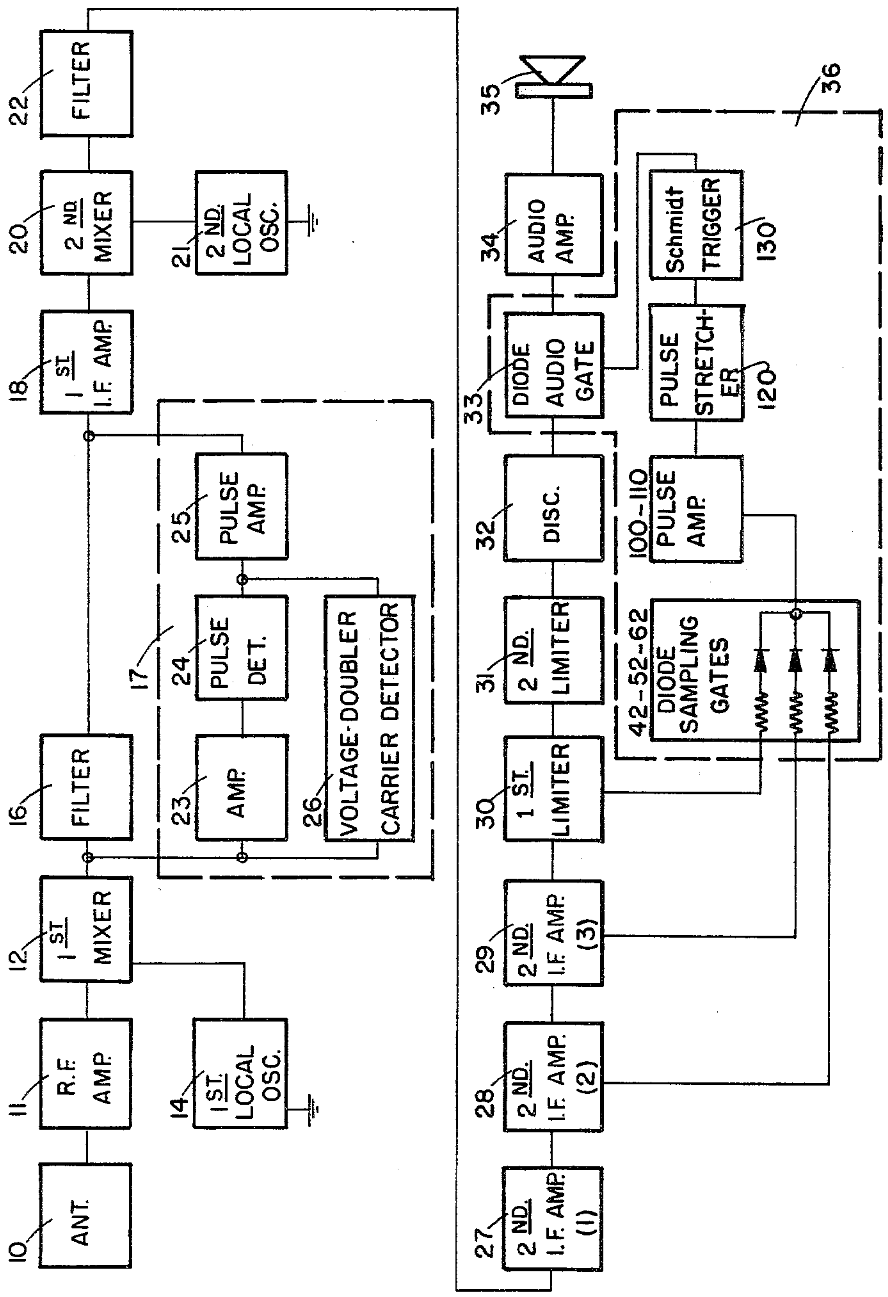
FIG. 1 is a block diagram of a frequency modulation receiver having a radio frequency blanking circuit and which includes a supplementary audio frequency noise blanking circuit in accordance with the invention.

In FIG. 1 there is illustrated in block diagram form a frequency modulation receiver of the double superheterodyne type which has been found to be quite effective in the very high frequency band. Antenna system 10 is connected to radio frequency amplifier 11 which passes the signal to the first mixer 12. The oscillator 14 provides a signal differing from the desired signal by a fixed amount to develop the first intermediate frequency. From the first mixer 12, the signal is fed into a filter 16, forming the input to first intermediate frequency amplifier 18.

Radio frequency noise blanking circuit 17 is connnected in parallel between the input of filter 16 and the input of first intermediate frequency amplifier 18. Hence, the desired signal plus any undesirable noise pulses are likewise coupled to the input of amplifier 23. The amplified signal is coupled to pulse detector 24 where any sudden amplitude variations superimposed on the carrier signal are converted into pulses being further amplified by pulse amplifier 25. These detected and amplified pulses are utilized for proper blanking action upon application to the first intermediate frequency amplifier 18. By proper selection of the amplifier 18 and its attendant circuitry, negative pulses applied to its control electrode cause it to cease conducting, thereby silencing the receiver for the duration of the disturbance pulses superimposed on the carrier signal. The voltage doubler carrier detector 26 is responsive to the carrier level at the input of noise blanking circuit 17 to develop a bias voltage sufficient to cut off the pulse amplifier 25 when this carrier level reaches a predetermined magnitude. The carrier detector 26 is similar in operation to the circuit disclosed in Patent No. 2,901,601 previously referred to.

It should be further noted that such blanking action on relatively short duration noise pulses does not appreciably affect the intelligibility of the communiaction since such blanking occurs in the wide band portion of the receiver before passing through the high Q tuned circuits of the intermediate frequency filter 22. Thus, to silence the receiver for 10–20 microseconds, which has been found to be the time required to eliminate a single impulse, would have none other than nominal affect on intelligibility. For these relatively short blanking durations, the tuned circuits of the intermediate frequency filter 22 operate to release stored energy to fill in the gap produced by cutting off intermediate frequency amplifier 18. In those instances, however, where noise pulses are of excessively long durations, the blanking action may exceed the time in which the tuned circuits of filter 22 can restore energy to the carrier signal which, in such cases, voids may appear in the carrier signal.

When not being subjected to the aforementioned blanking action, first intermediate frequency amplifier 18 feeds the second mixer 20. Oscillator 21 provides a signal differing from the first intermediate frequency by a fixed amount to develop the second intermediate frequency. From the second mixer 20 the signal is fed to the highly selective filter 22, forming the input to the second intermediate frequency amplifier 27. The signal is amplified by successive intermediate frequency amplifier stages 28 and 29, and fed to the first limiter stage 30. The signal is limited in the well known manner in limiter stages 30 and 31. The audio intelligence portion is detected in detector stage 32 and passed through normally forward biased diode audio gate 33 into audio amplifier 34 where it is amplified and rendered audible in receiver loudspeaker 35.

Figures 2, 3:
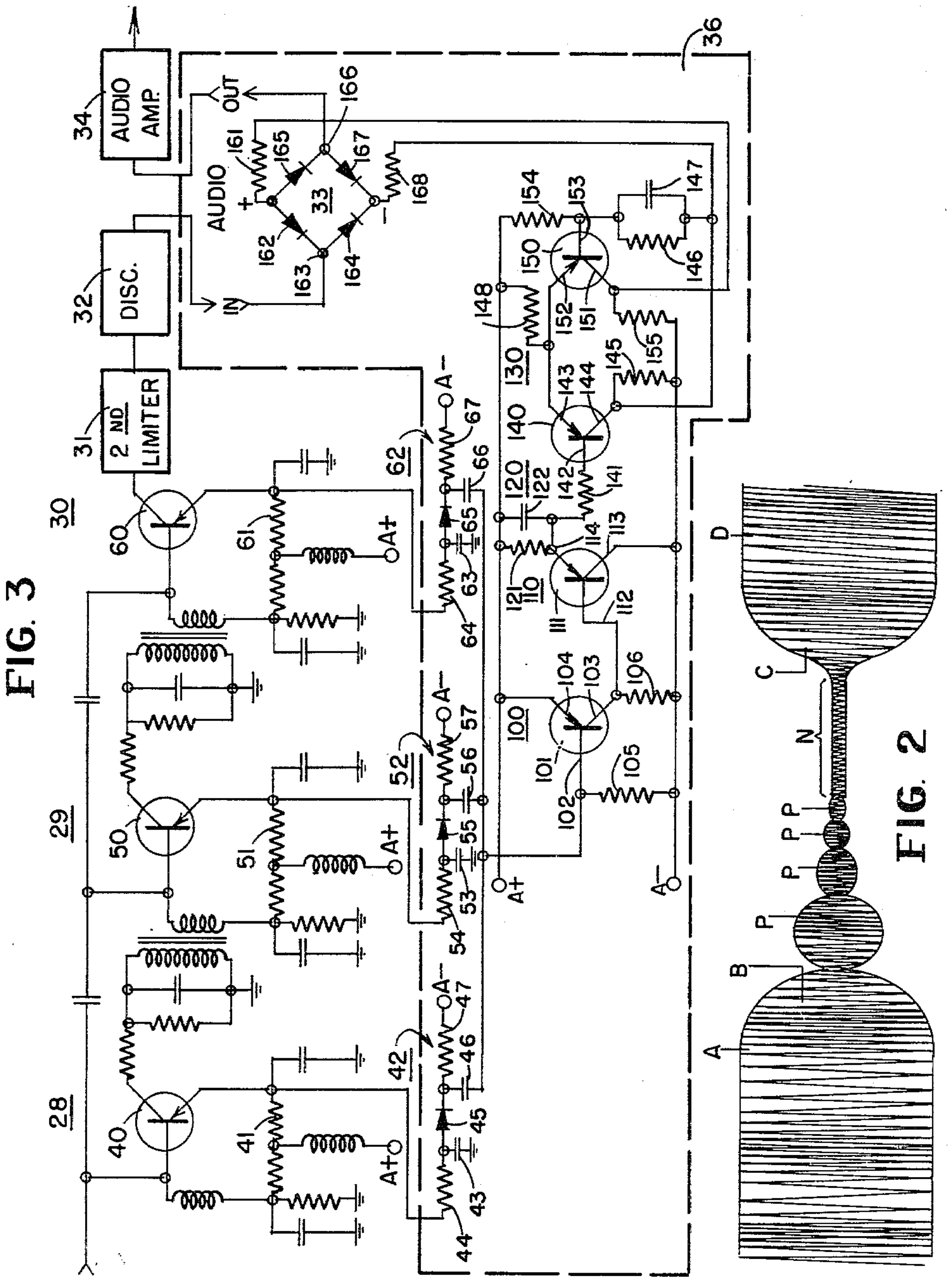
FIG. 2 is a graphic representation of a frequency modulation carrier signal illustrating a void therein which might result from blanking of the radio frequency portion of the receiver.
FIG. 3 is a schematic diagram of the supplementary audio frequency noise blanking circuit in accordance with the invention.

As previously mentioned, blanking in the radio frequency portion of the receiver on noise pulses of excessively long duration may cause voids to appear in the carrier signal. Further, due to possible "ringing" action of the tuned circuits in filter 22, the carrier signal may not be reduced to zero in a linear manner but rather as a series of damped oscillatory pulses as illustrated in FIG. 2. These pulses occur in a relatively short time such that they may be heard in the receiver loudspeaker as an objectionable "pop." Further, upon cessation of the ringing action by filter 22, the carrier is sustained at zero amplitude during the remainder of the blanking action such that the noise of mixer stage 20 or the noise of intermediate frequency amplifier 27 may be amplified to an extent where it may be rendered audible in the receiver loudspeaker 35. The length of these voids seldom exceed one millisecond. A primary function of the supplementary audio frequency noise blanker circuit 36 is to detect such voids in the carrier signal and decouple the audio portion of the receiver during their occurrence to prevent the objectionable audible bursts or tube noise. This circuit will be described in detail in connection with FIG. 3.

FIG. 2 is a graphic representation of a carrier void that may occur at the output of the selective filter 22 as a result of blanking action on noise pulses of long duration in the radio frequency portion of the receiver. The supplementary audio frequency blanker circuit 36 detects these carrier voids as predetermined drops in carrier signal strength, such as point B in FIG. 2, and prevents the series of damped oscillatory pulses, identified as letter P, and tube noise, identified by the letter N, from being rendered audible in the receiver loudspeaker. Further, the supplementary audio frequency blanker circuit 36 is operative to sustain the audio stages of the receiver in the decoupled condition for the duration of the carrier void, such as at point C, permitting reactivation only until such time as the carrier signal has regained full strength, such as at point D.

Referring to FIG. 3, there is illustrated a supplementary audio frequency blanker circuit 36 coupled to a portion of the receiver in accordance with the present invention. Diode sampling gates 42, 52, and 62 are coupled to the second intermediate frequency amplifier stages 28 and 29 and to the first limiter stage 30, respectively. The gain of the second intermediate frequency amplifier stages 28 and 29 and first limiter stage 30 are such that one, or all three, of the stages may be in the limiting condition depending on the strength of the received carrier signal. If a relatively weak signal is being received, it may be that only the limiter stages of the receiver are in the limiting condition. On relatively strong signals, it may be that one, or all, of the second intermediate frequency amplifier stages are likewise in the limiting condition. When a void occurs in the carrier, one or more of stages 28, 29 or 30 will drop out of limiting thereby causing a resultant voltage drop across their associated emitter resistors 41, 51 or 61. This voltage drop is coupled through the appropriate sampling gates 42, 52 and/or 62, as a voltage excursion to the input of amplifier stage 100.

For sampling gate 42, capacitor 43 and resistor 44 form a filter network to strip off any intermediate frequency components from the pulse signal. Diode 45 provides isolation with respect to the desired polarity between stages 28, 29 and 30, and resistor 47 provides a forward bias for diode 45. Capacitor 46 is a coupling capacitor as well as providing direct current isolation. For sampling gate 52, capacitor 53 and resistor 54 form the filter trap network; diode 55 is the isolating diode; resistor 57 is the bias resistor; and capacitor 56 is the coupling capacitor. As indicated, like components are employed in sampling gate 62.

Pulse signals appearing at input 102 of transistor pulse amplifier stage 100 are amplified by the transistor 101 and coupled to transistor emitter follower stage 110 for further amplification by transistor 111. Resistor 105 provides the forward bias for transistor 101, and resistor 106 is the collector load resistor for transistor 101 as well as providing the forward bias for transistor 111. Transistor 101 is normally saturated while transistor 111 is normally cut off. Resistor 121 and capacitor 122 of network 120 form a pulse stretching circuit, with the values thereof chosen to provide a time constant sufficient to lengthen the pulses to a duration which insures that the receiver audio portion will remain decoupled for a predetermined interval after the carrier signal has regained full strength.

The amplified and lengthened pulses are direct current coupled to the input of transistor 140 of a Schmitt trigger device 130, consisting of transistors 140 and 150. This device is well known in the art and detailed description is assumed not necessary other than to reiterate that its function is to switch in response to control pulses in a rapid manner such that switching transients will not be audible in the receiver loudspeaker. Trigger device 130 is set such that stage 150 is normally conducting and stage 140 is normally non-conducting. In this condition, collector electrode 151 of stage 150 holds resistor 161 at a positive potential and collector electrode 144 of stage 140 holds resistor 168 at a negative potential. This results in a current flow through resistor 161, through diode gate network 33, to resistor 168.

With the individual diodes 162, 164, 165 and 167 of gate 33 thus biased in the forward direction, audio signals appearing at point 163 of the audio gate 33 are effectively coupled on through to audio amplifier stage 34. A control pulse appearing at input 142 of transistor 140 operates to render transistor 150 non-conductive and transistor 140 conductive. As a result, bias at the audio gate 33 is reversed such that audio intelligence signals appearing at point 163 are effectively blocked from passing through, thereby decoupling the audio stage 34 and succeeding stages from the remainder of the receiver. The network including resistor 146 and capacitor 147, connected between the collector electrode 144 of transistor 140 and and the base electrode 153 of transistor 150, frequency compensate trigger device 130 in the well known manner such that rapid switching characteristics are thereby provided.

Thus it may be seen that the invention provides a comparatively simple supplementary audio frequency noise blanking circuit operative to decouple the audio portion of the receiver when voids occur in the carrier signal due to disturbance pulses of excessively long durations being removed in the radio frequency portion of the receiver. Further, the supplementary audio frequency blanking circuit has been made responsive to a predetermined decrease in carrier signal strength to prevent oscillatory pulses caused by the ringing action of the intermediate frequency amplifier filter from producing objectional audible bursts in the receiver loudspeaker. By providing a pulse lengthening means, control pulses are developed therein whereby the receiver loudspeaker is not reactivated until after the carrier signal has regained full strength.

We claim:

1. In a superheterodyne receiver including intermediate frequency amplifier, limiter and audio stages and having radio frequency noise blanking means coupled ahead of such stages which may cause voids to appear in the carrier wave in the intermediate frequency amplifier and limiter stages; supplementary audio frequency noise blanking means responsive to carrier voids for decoupling said receiver audio stage during the occurrence of such voids, said supplementary audio frequency noise blanking means including in combination, sampling means coupled to at least one of the receiver intermediate frequency amplifier stages for producing pulse signals in response to said carrier voids, pulse amplifier means, means applying pulse signals from said sampling means to said pulse amplifier means, and means coupled to said pulse amplifier means and to the receiver audio stage to prevent translation of signals through such audio stages in response to an amplified pulse signal.

2. In a superheterodyne receiver including intermediate frequency amplifier, limiter and audio stages, and having radio frequency noise gating means operative ahead of such stages which may cause voids in the carrier signal; supplmentary audio frequency noise blanking means operative to block intelligence signals at the receiver audio stages in response to such carrier voids, said supplementary audio frequency noise blanking means including in combination, sampling means coupled to at least one intermediate frequency amplifier stage of the receiver for producing pulse signals in response to said carrier voids, pulse amplifier means, means applying pulses from said sampling means to said pulse amplifier means, pulse lengthening means coupled to said pulse amplifier means for lengthening the duration of the amplified pulse by a predetermined amount, and means coupled to said pulse lengthening means and to a receiver audio stage and operating to block intelligence signals at the receiver audio stages in response to pulses therefrom and during the occurrence of a lengthened pulse.

3. In a superheterodyne receiver including a plurality of intermediate frequency amplifier and limiter stages, detector and audio stages, and radio frequency noise blanking means coupled ahead of such stages for removing disturbance pulses of amplitude greater than the received carrier signal, and which noise blanking means may cause voids in the carrier signal in the removal of disturbance pulses of long duration, a supplementary audio frequency noise blanking system operative to decouple the audio frequency section of the receiver during occurrence of such carrier voids, said supplementary noise blanking system including in combination, first transistor amplifier means having base, emitter and collector electrodes and an input connected to said base electrode, a plurality of diode sampling means individually coupled to a plurality of intermediate frequency amplifier and limiter stages, said diode sampling means detecting voids in the carrier signal in response to predetermined drops in signal strength in such stages and producing pulses in response thereto, means coupling said diode sampling means to said input of said first transistor amplifier means and applying pulses to the base electrode thereof, second transistor amplifier means having base, emitter and collector electrodes, means coupling said first amplifier means to said second amplifier means to apply amplified signals thereto, monostable trigger means having a normally non-conducting transistor stage with base, collector and emitter electrodes and a normally conducting transistor stage with base, collector and emitter electrodes, means coupling said second amplifier means to said normally non-conductive stage of said monostable trigger means, audio gating means including a diode bridge circuit coupling the receiver detector to the audio stages, said diode bridge being further coupled to said collector electrodes of said stages of said monostable trigger means, said monostable trigger means normally supplying a forward bias to said diode bridge circuit of said audio gating means to cause audio intelligence signals to be passed thereby, said monostable triggering means being responsive to control pulses from said second amplifier to reverse said bias applied to said audio gating means to block the passage of audio intelligence signals during the occurrence of said control pulses.

4. In a superheterodyne receiver including a first section for translating received radio frequency signals to signals of intermediate frequency and having a noise blanking circuit coupled thereto for removing high amplitude disturbance pulses superimposed on the received signal, and a second section having intermeditae frequency amplifier, limiter, detector and audio amplifier stages for repeating the intermediate frequency signals and translating the intelligence portion thereof; a supplementary audio frequency noise blanking circuit operative to decouple the receiver audio amplifier stages in response to voids appearing in the carrier signal resulting from the removal in said first receiver section of disturbance pulses of excessively long durations, said supplementary audio frequency noise blanker circuit including in combination, pulse amplifying means having input and output circuits, a plurality of diode sampling means coupling a plurality of intermediate frequency amplifier and limiter stages to said input of said pulse amplifying means, said sampling means being adapted to produce control pulses in response to carrier voids, audio gating means serving to pass intelligence signals from the detector to the audio amplifier stages of the receiver, means coupling said audio gating means to said output of said pulse amplifying means, said audio gating means being responsive to control pulses produced by said sampling means to decouple the audio amplifier stages during the occurrence of such carrier voids.

5. In a highly selective communications receiver including a first section for receiving and translating a radio frequency signal to a further signal of intermediate frequency and having a noise blanking means coupled thereto which may cause voids to appear in the received signal, and a second section having amplifier stages for repeating the intermediate frequency signal and detector and audio amplifier stages for detecting and reproducing the modulating signal; a supplementary audio frequency noise blanking circuit to interrupt the reproduction of the modulating signal at the audio amplifier stages, said supplementary audio frequency noise blanking circuit including in combination, pulse amplifying means, sampling means coupled to at least one intermediate frequency amplifying stage for applying signals therefrom to said pulse amplifier means, said sampling means being adapted to produce control pulses in response to voids appearing in the carrier signal, audio gating means adapted to couple the detected modulating signal from the detector stage of the receiver to the audio amplifier stages, monostable trigger means coupling said audio gating means to said pulse amplifier means, said trigger means including means for normally supplying a forward bias to said audio gating means, said trigger means being responsive to control pulses from said pulse amplifying means for applying a reverse bias to said audio gating means for rendering the same inoperative to pass the detected modulating signal, said pulse amplifying means including means for lengthening the duration of said control pulses to hold said audio gating means inoperative until the carrier signal has regained full strength and for a predetermined time thereafter.

6. Apparatus according to claim 5 wherein the monostable triggering means includes a normally conducting stage having input and output circuits and a normally non-conducting stage having input and output circuits, said audio gating means being coupled between said output circuits of said monostable triggering stages, said monostable triggering means being responsive to control pulses at said input of said normally non-conducting stage to render the same conducting and bias off said audio gating means thereby decoupling the audio stages of the receiver.

7. Apparatus according to claim 5 wherein the audio gating means consists of a plurality of diodes connected in a bridge circuit having first, second, third and fourth terminals, said forward bias being normally applied from said monostable triggering means between said second and fourth terminals such that said diodes are normally conducting, said detected modulating signal from said receiver detector stage being applied to said first terminal, said third terminal being connected to said receiver audio stage, said detected modulating signal being coupled through said diodes from said first terminal to said third terminal when said diodes are forward biased.

8. A superheterodyne radio receiver including in combination, a first portion for receiving and translating radio frequency signal waves which may be accompanied by noise pulses and having noise blanking means coupled thereto for removing such noise pulses which may cause voids to appear in the signal wave, a second portion for repeating the signal and translating and reproducing the intelligence portion thereof, and a supplementary audio frequency noise blanking circuit including sampling means coupled to said second receiver portion and adapted to produce control pulses in response to such carrier voids, audio gating means serving to normally pass intelligence signals within said second receiver portion, pulse amplifier means having input and output circuits, means coupling said sampling means to said input circuit of said pulse amplifier means, switching means coupling said output circuit of said pulse amplifier means and said audio gating means, said switching means actuating said gating means to interrupt passage of intelligence signals through said audio gating means in response to said control pulses from said output of said pulse amplifier means.

9. A superheterodyne radio receiver including in combination, a first portion for receiving and translating radio frequency signal waves which may be accompanied by noise pulses and having noise blanking means coupled thereto for removing such noise pulses which may cause voids to appear in the signal wave, a second portion including amplifying means for repeating the signal waves and detector and audio amplifier means for translating and reproducing the intelligence portion thereof, and a supplementary audio frequency noise blanking circuit including sampling means coupled to said second receiver portion and adapted to produce control pulses in response to such carrier voids, pulse amplifier means having an input circuit coupled to said sampling means and an output circuit, and control means having an input circuit coupled to said output circuit of said pulse amplifier means, said control means being coupled to said audio amplifier means and operative in response to a control pulse to prevent the passage of intelligence signals through said audio amplifier means.

10. A superheterodyne radio receiver including in combination, a first portion for receiving and translating radio frequency signal waves which may be accompanied by noise pulses and having noise blanking means coupled thereto for removing such noise pulses which may cause voids to appear in the signal wave, a second portion for repeating the signal waves and for translating and reproducing the intelligence portion thereof, said second receiver portion including audio amplifier means, transistor intermediate frequency means having base, collector and emitter electrodes and a load resistor connected to said emitter electrode, and a supplementary audio frequency noise blanking circuit including diode sampling means coupled to said emitter electrode of said intermediate frequency amplifier means, said sampling means producing a pulse in response to a change in voltage drop across said emitter load resistor in said intermediate frequency amplifier means as the signal therein drops, pulse amplifier means having an input circuit coupled to said sampling means and an output circuit, and control means having an input circuit coupled to said output circuit of said pulse amplifier means, said control means being coupled to said audio amplifier means and operative in response to a control pulse to prevent the passage of intelligence signals through said audio amplifier means.

References Cited by the Examiner

UNITED STATES PATENTS 2,901,601 8/59 Richardson ____________ 325—474

DAVID G. REDINBAUGH, *Primary Examiner.*